United States Patent
Nakai et al.

(10) Patent No.: US 12,038,449 B2
(45) Date of Patent: Jul. 16, 2024

(54) AUTOMATIC ANALYZER AND MAINTENANCE SUPPORT METHOD

(71) Applicant: Hitachi High-Tech Corporation, Tokyo (JP)

(72) Inventors: Marina Nakai, Tokyo (JP); Tatsuki Takakura, Tokyo (JP); Shunsuke Sasaki, Tokyo (JP); Kenta Imai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 474 days.

(21) Appl. No.: 17/273,423

(22) PCT Filed: Nov. 13, 2019

(86) PCT No.: PCT/JP2019/044485
§ 371 (c)(1),
(2) Date: Mar. 4, 2021

(87) PCT Pub. No.: WO2020/137216
PCT Pub. Date: Jul. 2, 2020

(65) Prior Publication Data
US 2021/0341503 A1  Nov. 4, 2021

(30) Foreign Application Priority Data
Dec. 25, 2018  (JP) .................. 2018-240725

(51) Int. Cl.
*G01N 35/00* (2006.01)
*G06F 3/14* (2006.01)
(Continued)

(52) U.S. Cl.
CPC ......... *G01N 35/00722* (2013.01); *G06F 3/14* (2013.01); *G06T 7/0002* (2013.01); *H04N 23/57* (2023.01); *G01N 2035/00891* (2013.01)

(58) Field of Classification Search
CPC ....... G01N 35/00584; G01N 35/00722; G01N 35/00871; G01N 2035/00891; H04N 23/57; G06T 7/0002; G06F 3/14
(Continued)

(56) References Cited

U.S. PATENT DOCUMENTS 9,297,818 B2 * 3/2016 Fujita .............. G01N 35/00712
9,625,482 B2 4/2017 Yamada et al.
(Continued)

FOREIGN PATENT DOCUMENTS

CN 102435761 A 5/2012
CN 107727647 A 2/2018
(Continued)

OTHER PUBLICATIONS

Search Report dated Jan. 7, 2020 in corresponding International Application No. PCT/JP2019/044485.
(Continued)

*Primary Examiner* — John H Le
(74) *Attorney, Agent, or Firm* — Miles & Stockbridge, P.C.

(57) ABSTRACT

Provided is an automatic analyzer in which user work is in conjunction with apparatus driving and operation of a user even in complicated maintenance work is simplified. The automatic analyzer includes a measurement device 2 and a control device 3. The control device controls the measurement device. The control device includes an input unit 32 that receives a start instruction of maintenance work by a user, a control unit 31 that controls an apparatus to perform a predetermined first processing in accordance with input, a driving unit that performs driving in accordance with processing of the control unit, a display unit 33 that displays a second processing to be performed by the user in conjunction with the first processing after the first processing is
(Continued)

terminated by the driving unit. The control device sequentially guides maintenance work of the user by performing the first processing or the second processing after the displayed second processing is executed by the user.

14 Claims, 19 Drawing Sheets

(51) Int. Cl.
    *G06T 7/00*      (2017.01)
    *H04N 23/57*     (2023.01)
(58) Field of Classification Search
    USPC .......................................................... 702/184
    See application file for complete search history.

(56) References Cited

U.S. PATENT DOCUMENTS

| | | |
|---|---|---|
| 2010/0290950 A1 | 11/2010 | Nakaya et al. |
| 2012/0064638 A1 | 3/2012 | Onomichi et al. |
| 2012/0282155 A1 | 11/2012 | Kuwano et al. |
| 2013/0311243 A1 | 11/2013 | Taki et al. |
| 2015/0241458 A1 | 8/2015 | Pollack |
| 2020/0191810 A1* | 6/2020 | Yamamoto ................ F16P 1/02 |

FOREIGN PATENT DOCUMENTS

| | | |
|---|---|---|
| JP | 2008216173 A | 9/2008 |
| JP | 2009-168491 A | 7/2009 |
| JP | 2009181328 A | 8/2009 |
| JP | 2010-175420 A | 8/2010 |
| JP | 201376619 A | 4/2013 |
| JP | 2015092197 A | 5/2015 |
| JP | 2018197716 A | 12/2018 |
| WO | 2012120755 A1 | 9/2012 |

OTHER PUBLICATIONS

Written Opinion dated Jan. 7, 2020 in corresponding International Application No. PCT/JP2019/044485.
Search Report dated Aug. 16, 2022 in European Application No. 19903218.6.
Office Action dated Nov. 30, 2023 in Chinese Application No. 201980067177.4.

* cited by examiner

[FIG. 1]
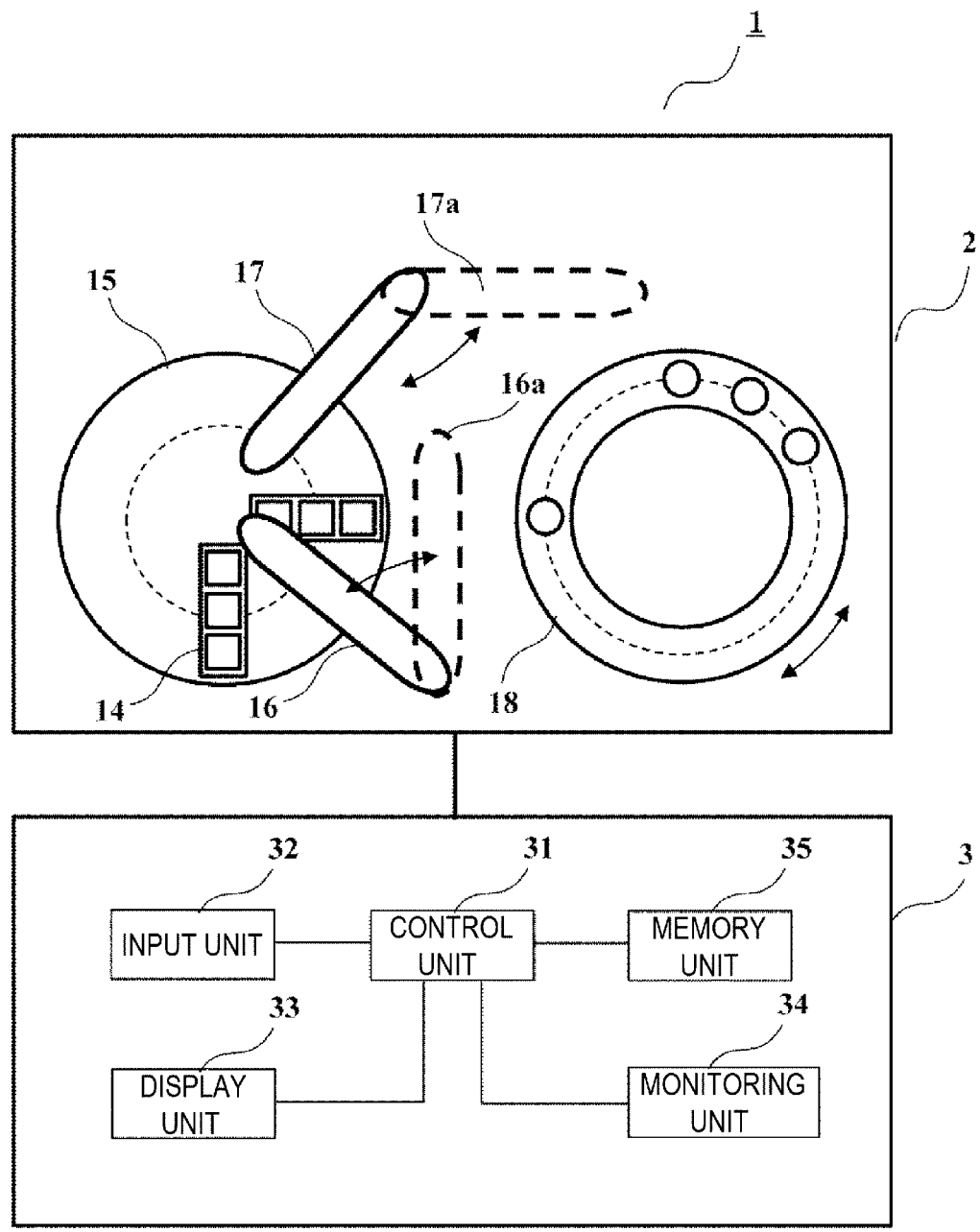

[FIG. 2]
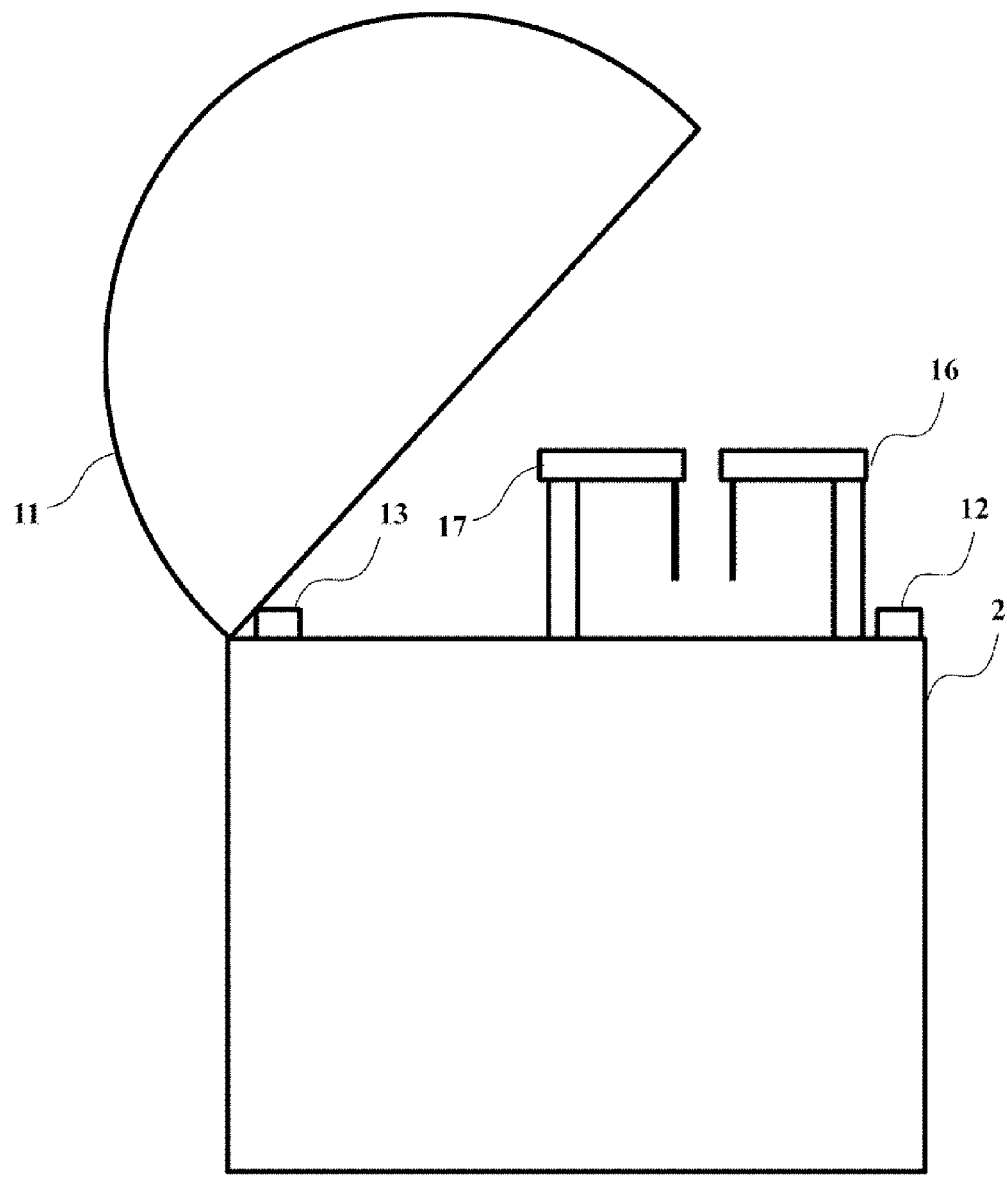

[FIG. 3]
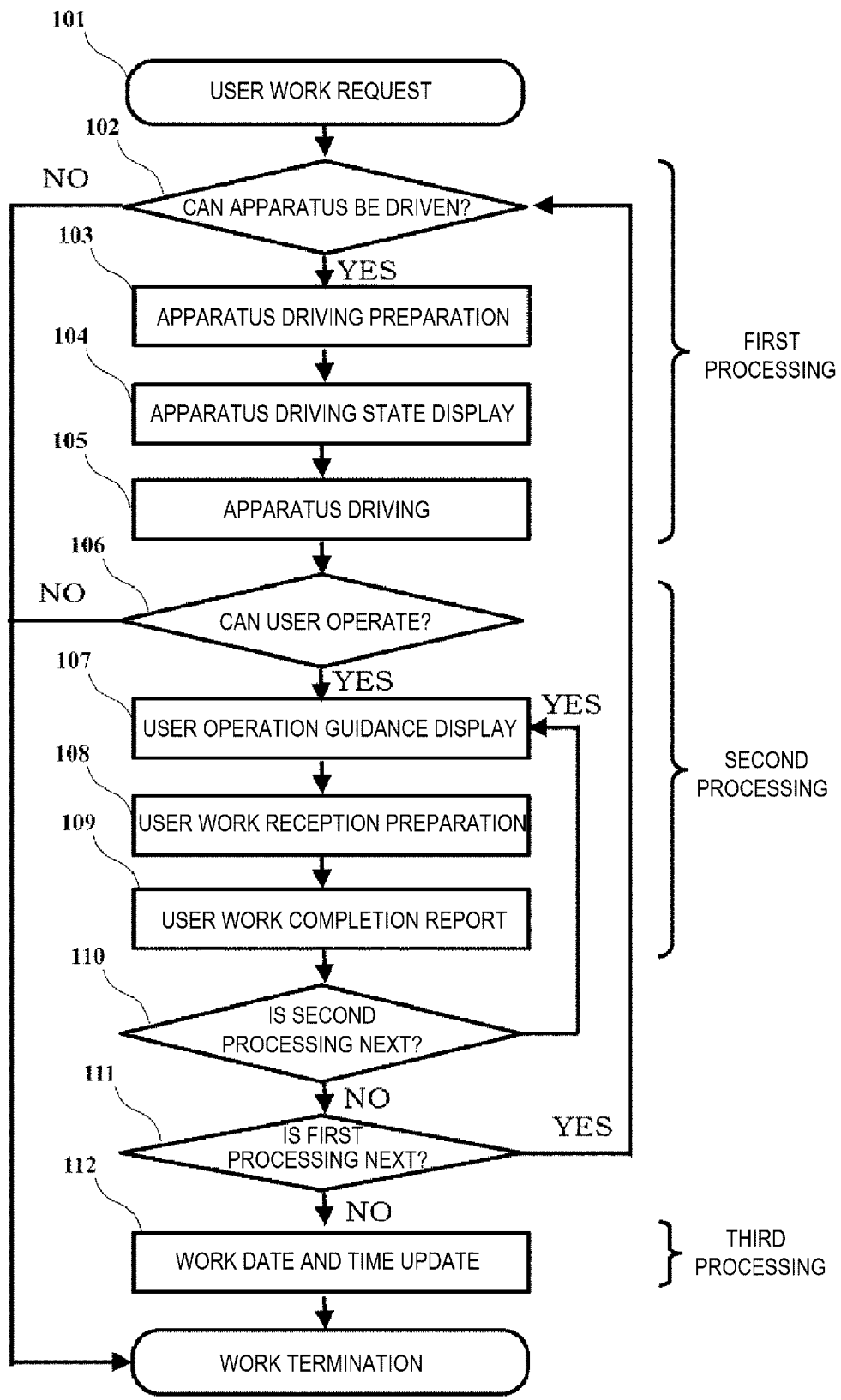

[FIG. 4]
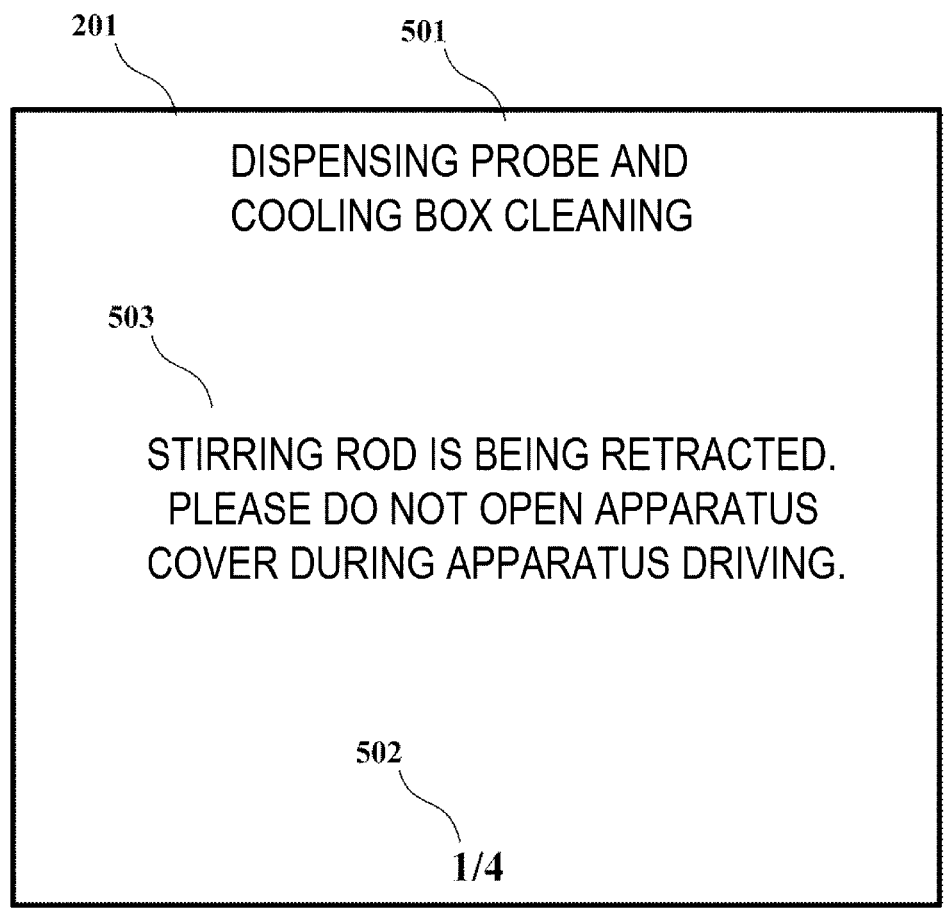

[FIG. 5]
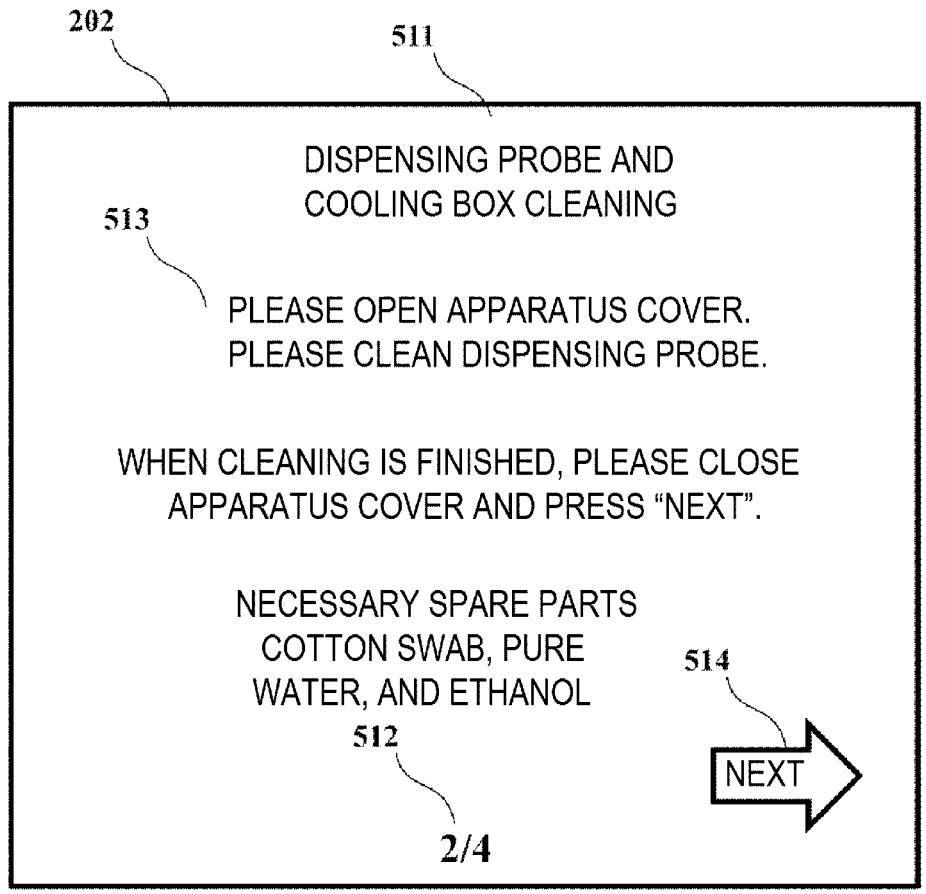

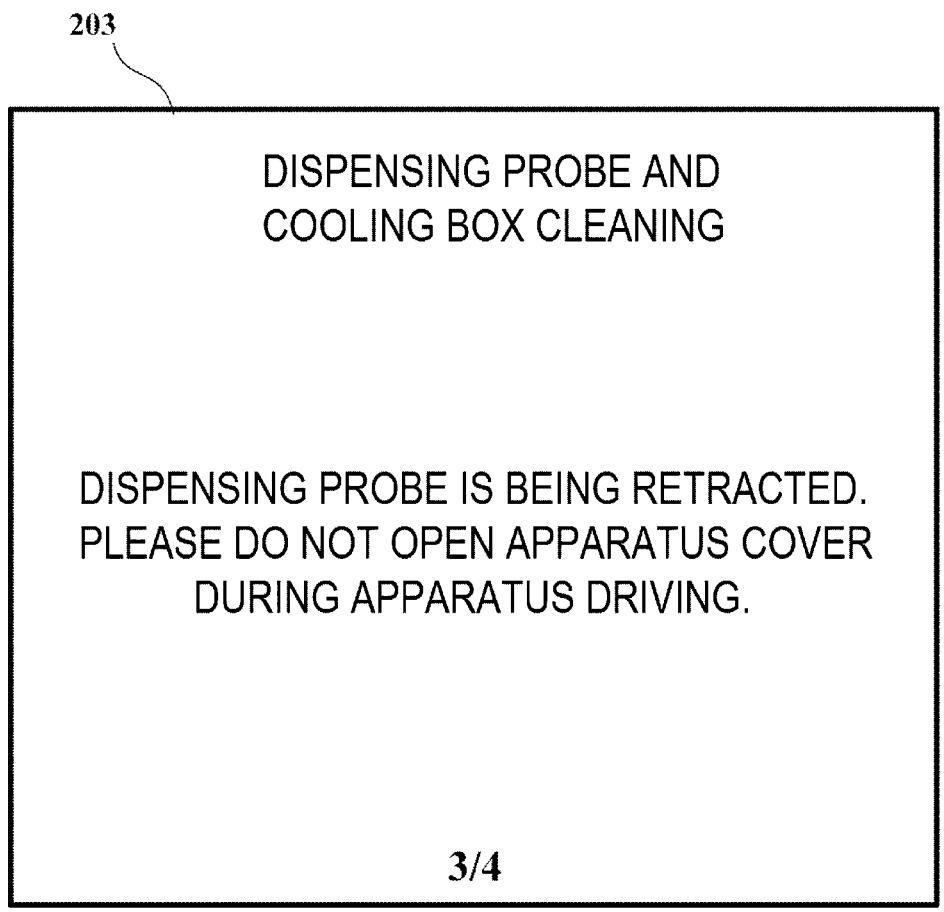

[FIG. 7]
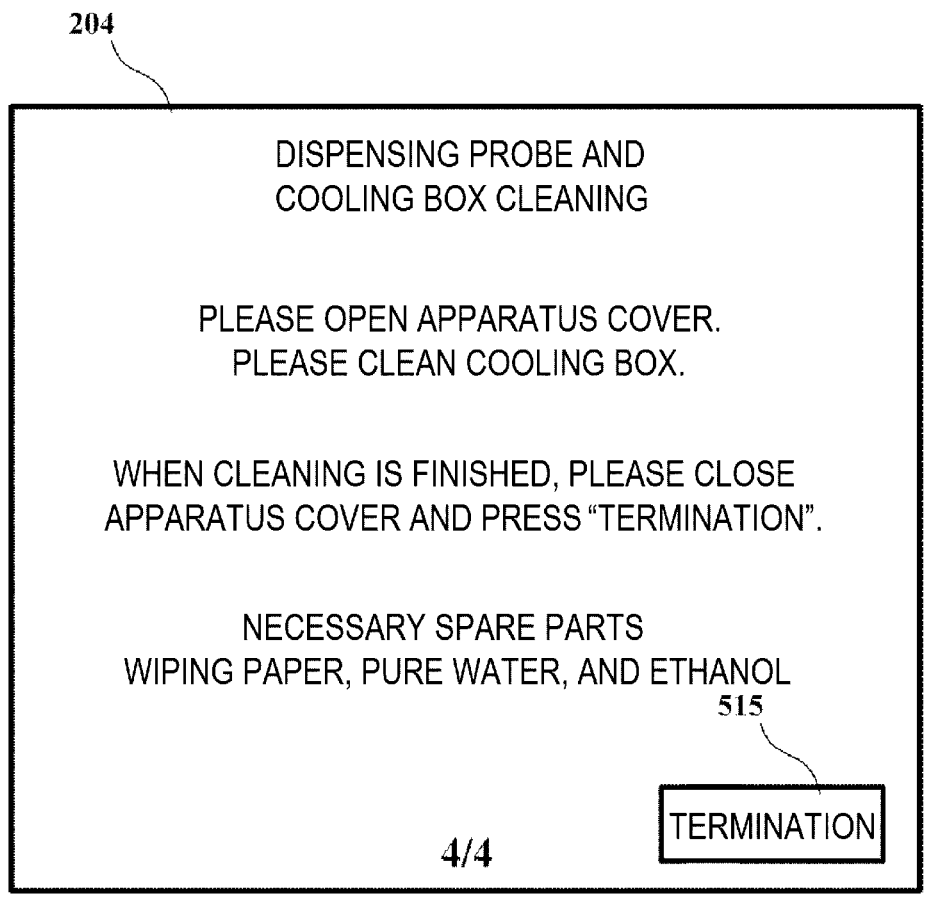

[FIG. 8]
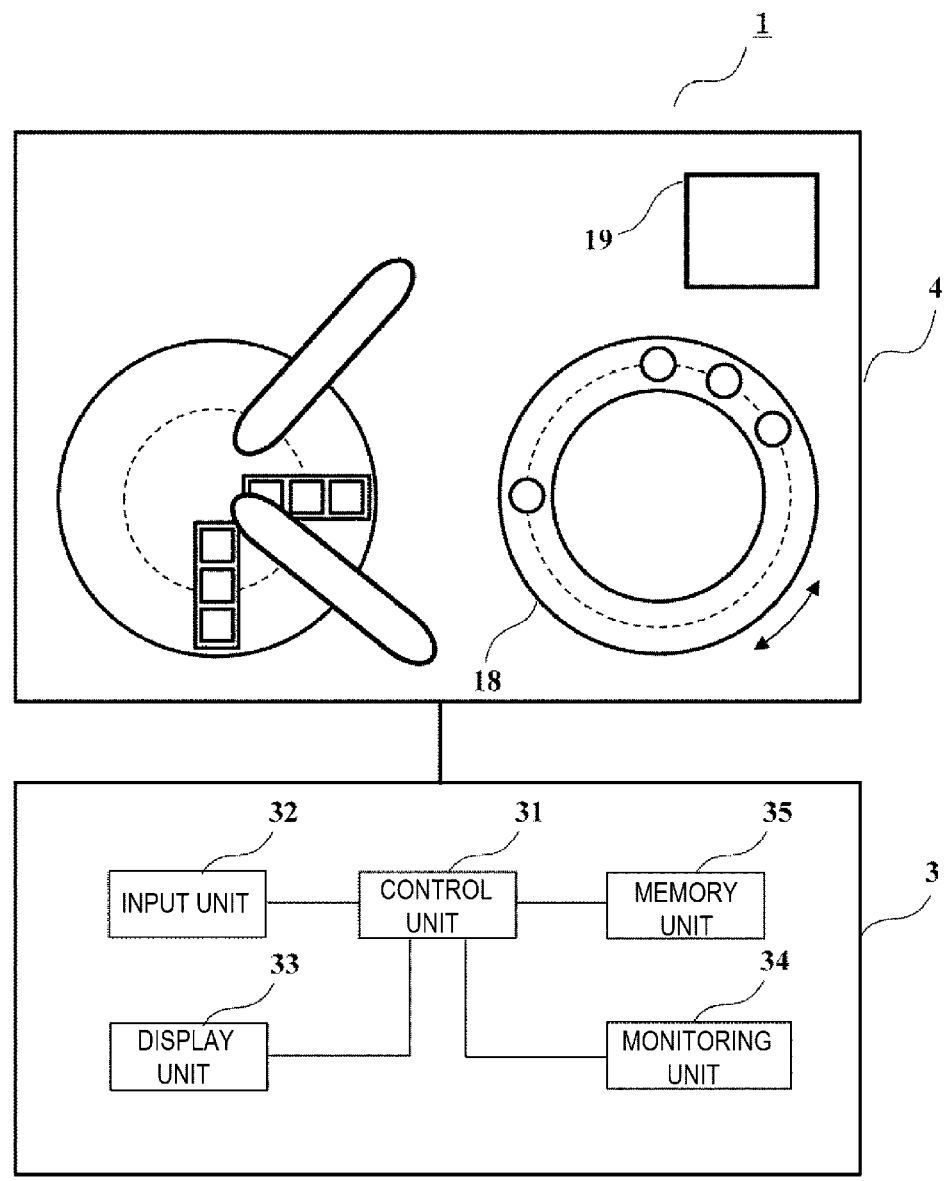

[FIG. 9]
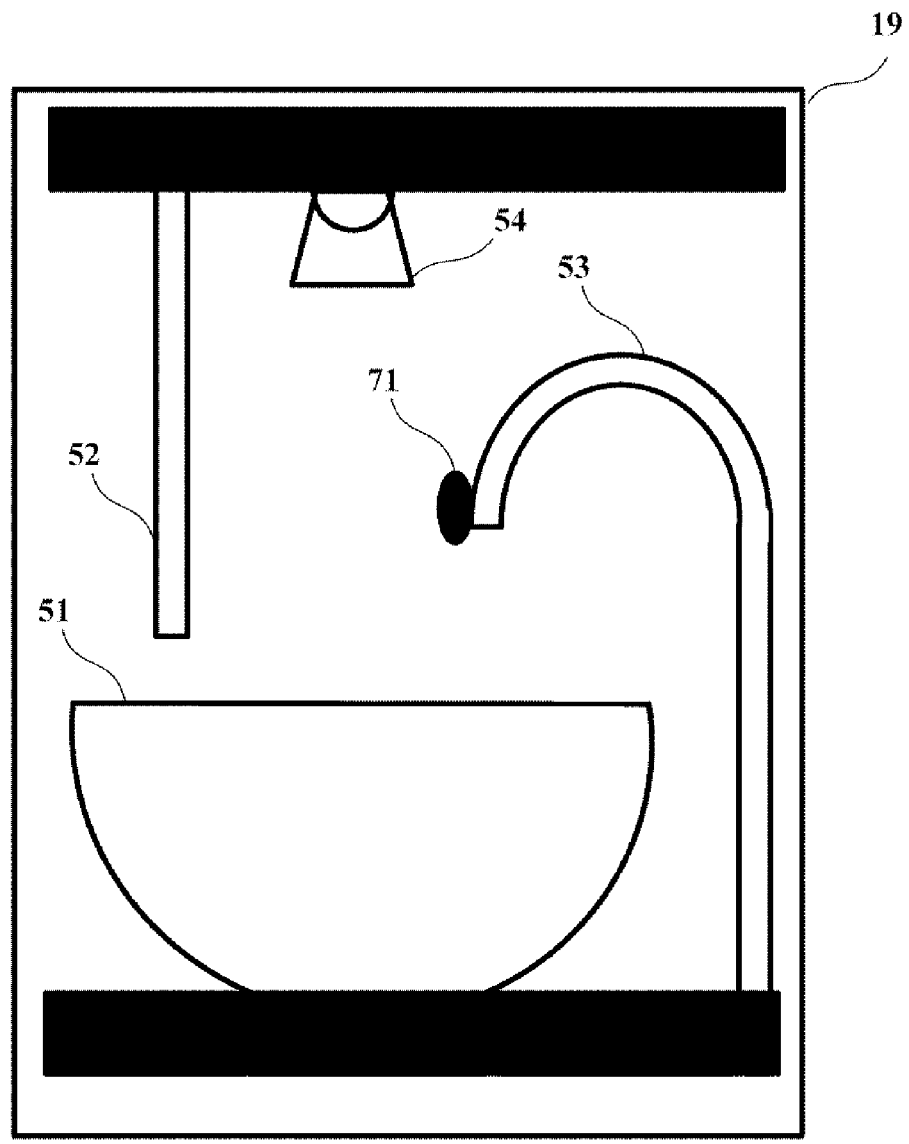

[FIG. 10]
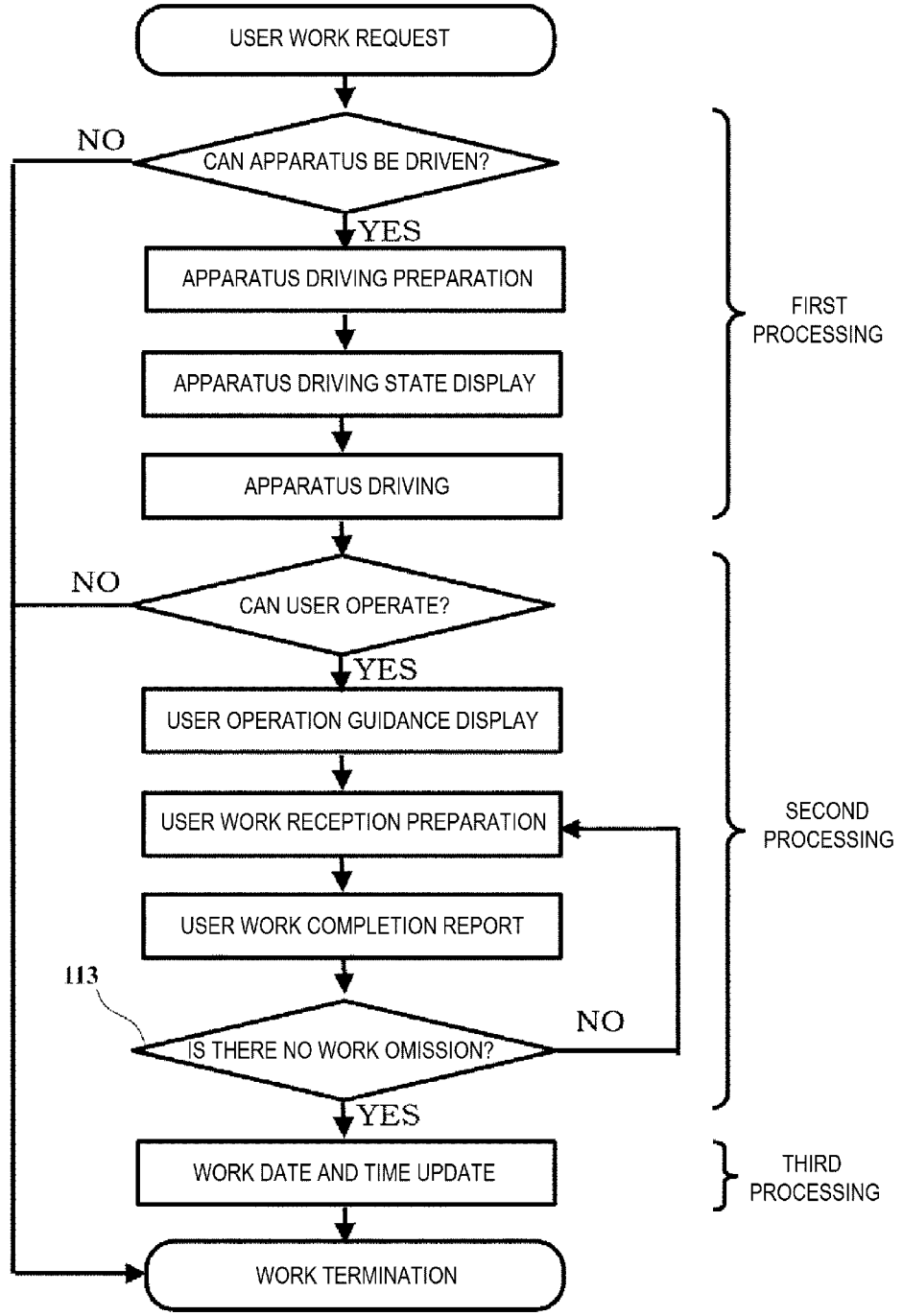

[FIG. 11]
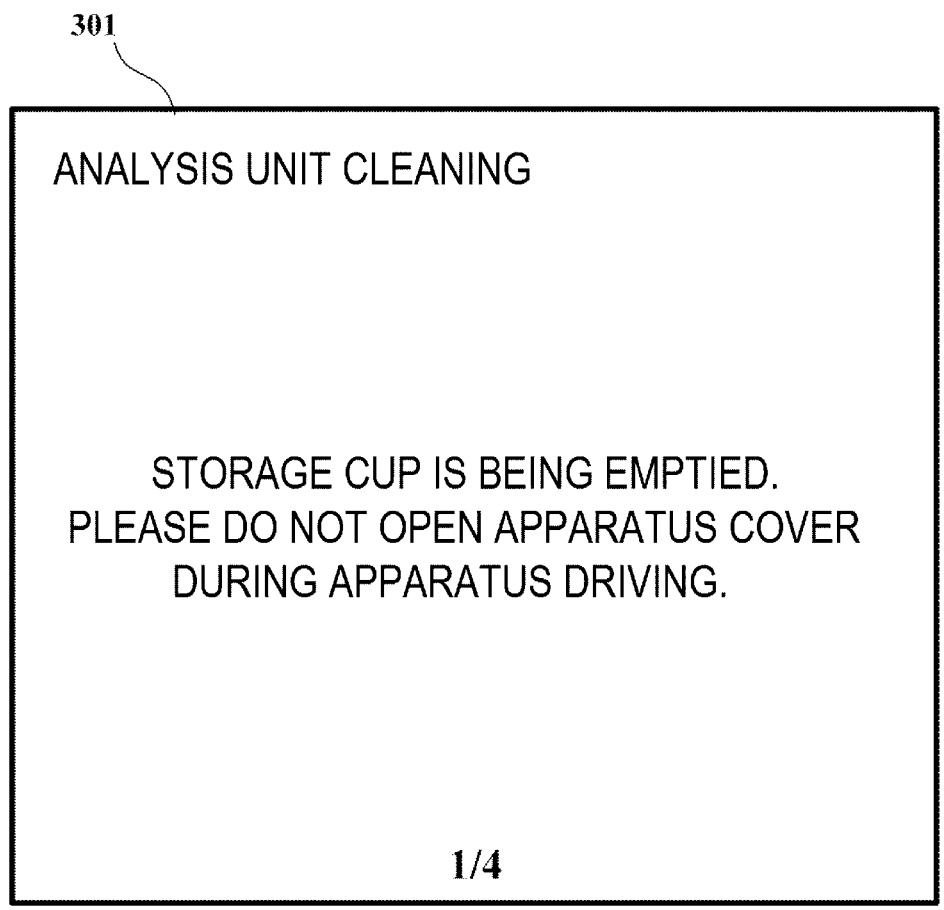

[FIG. 12]
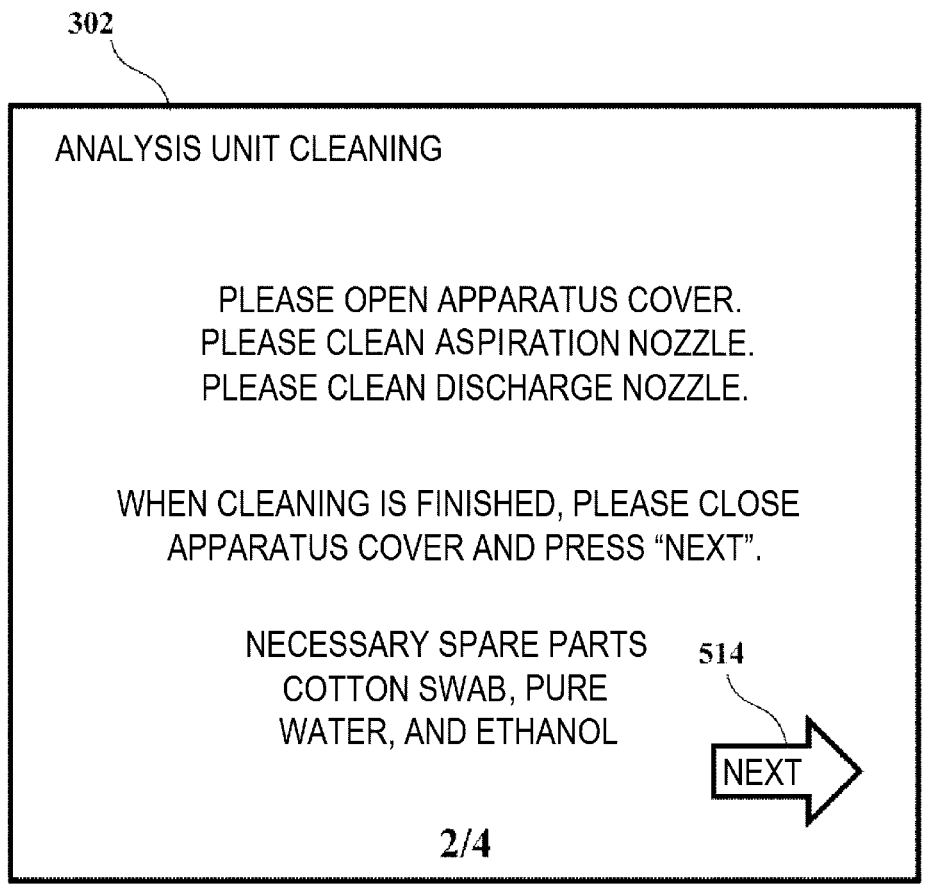

[FIG. 13]
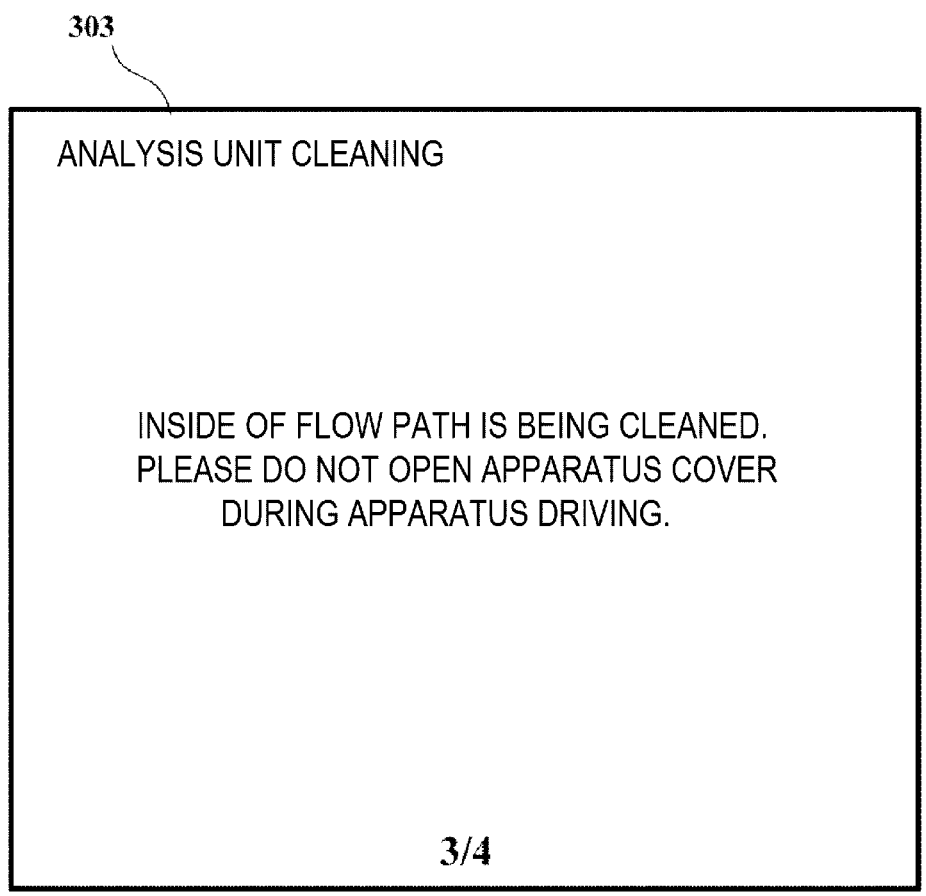

[FIG. 14]
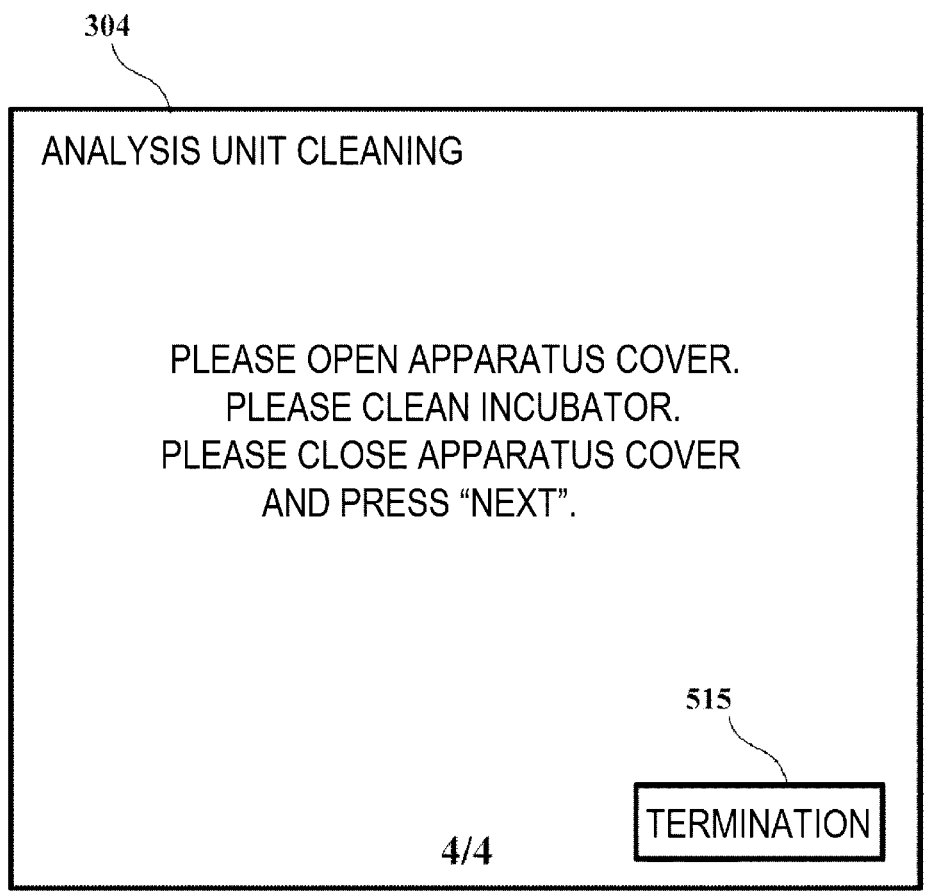

[FIG. 15]
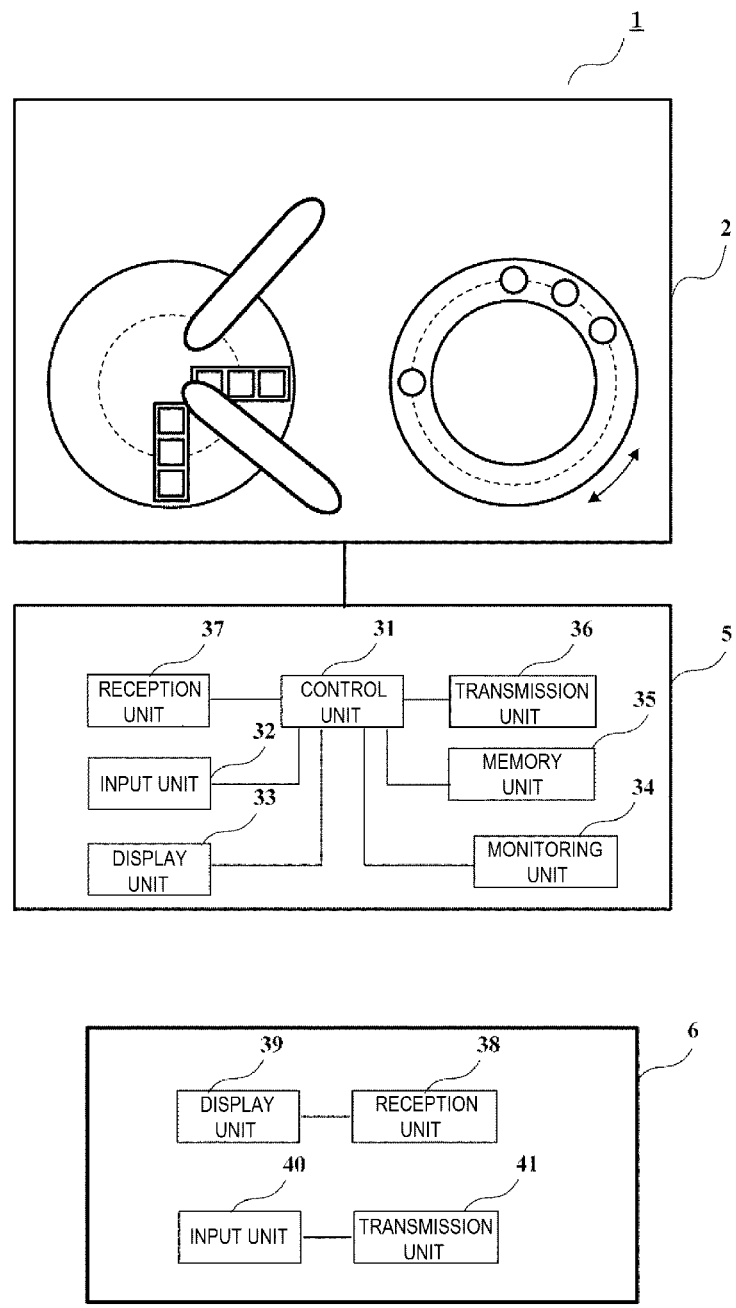

[FIG. 16]
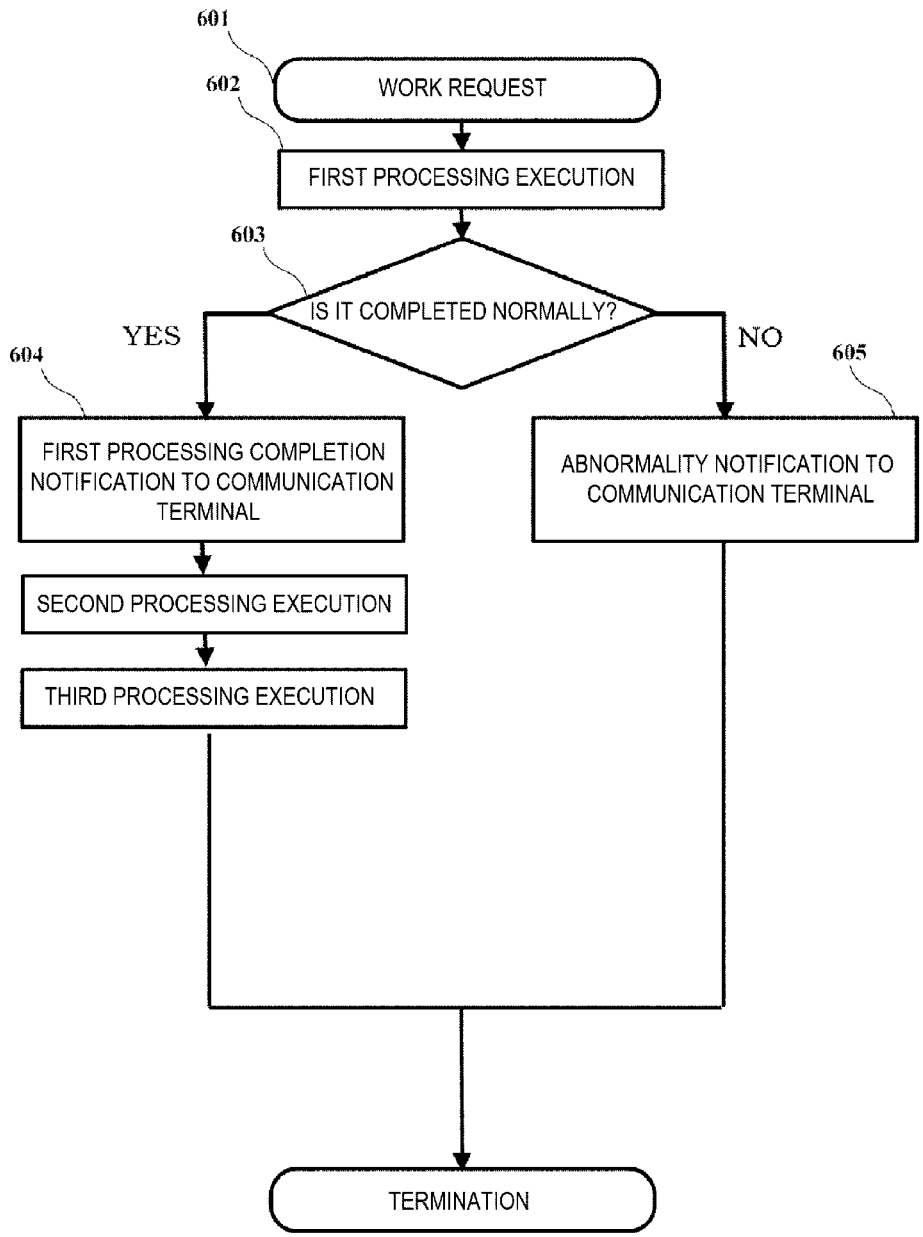

[FIG. 17]
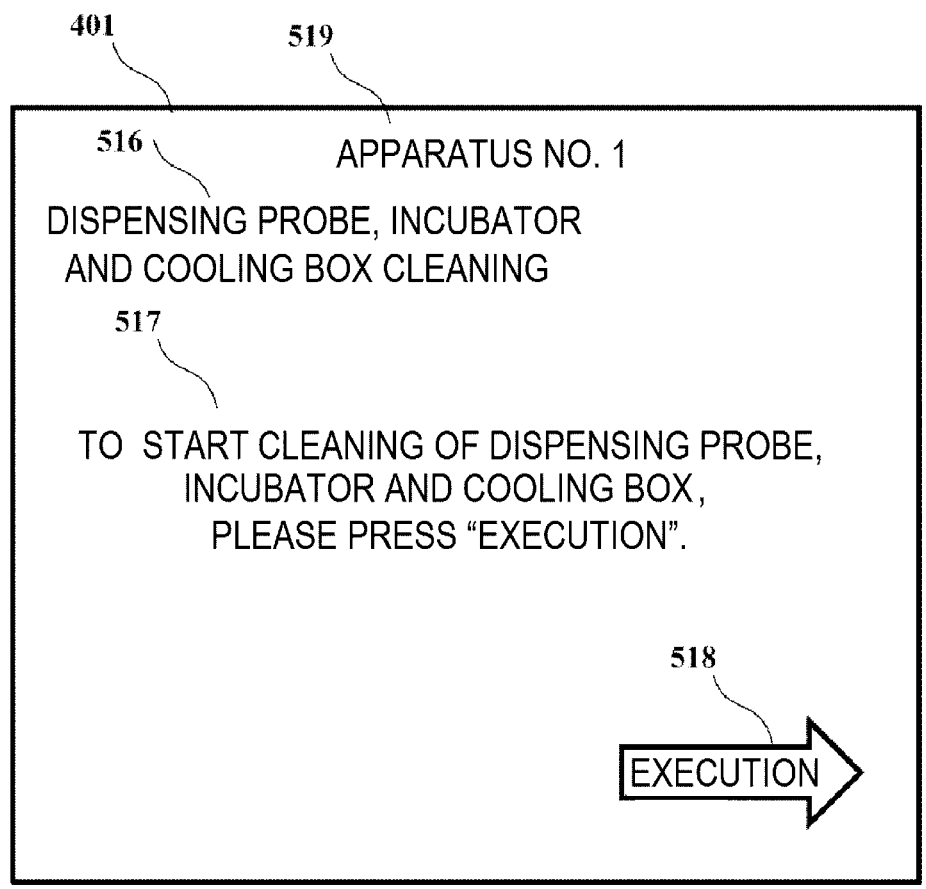

[FIG. 18]
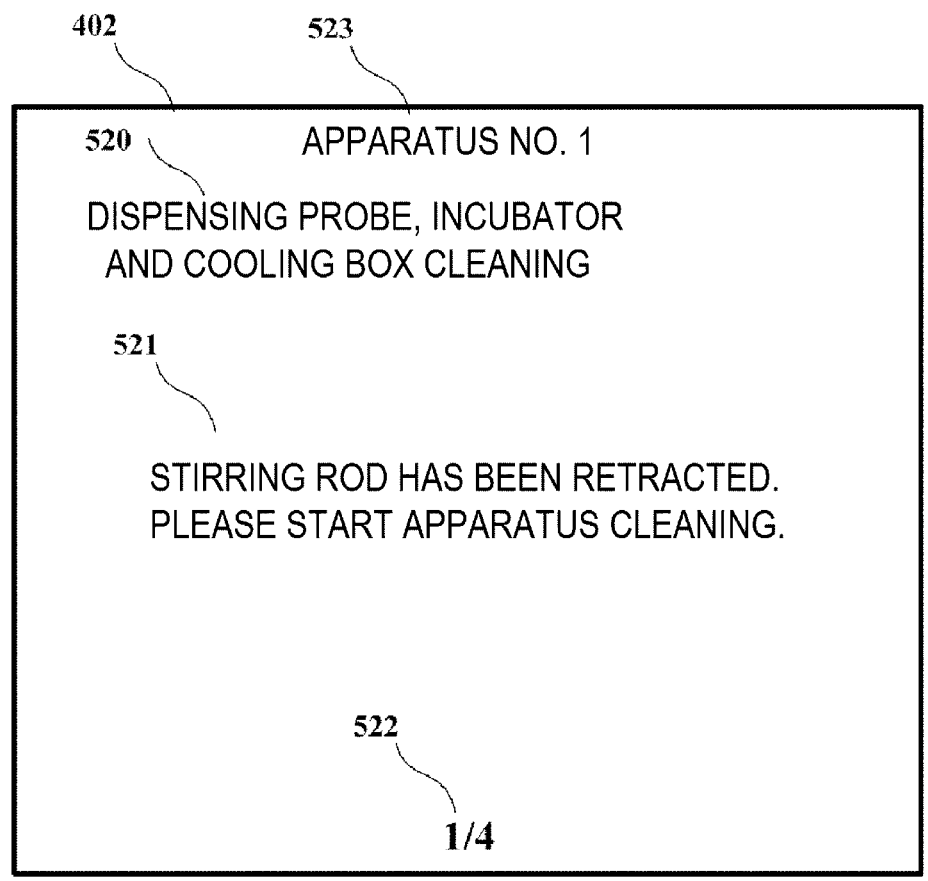

[FIG. 19]
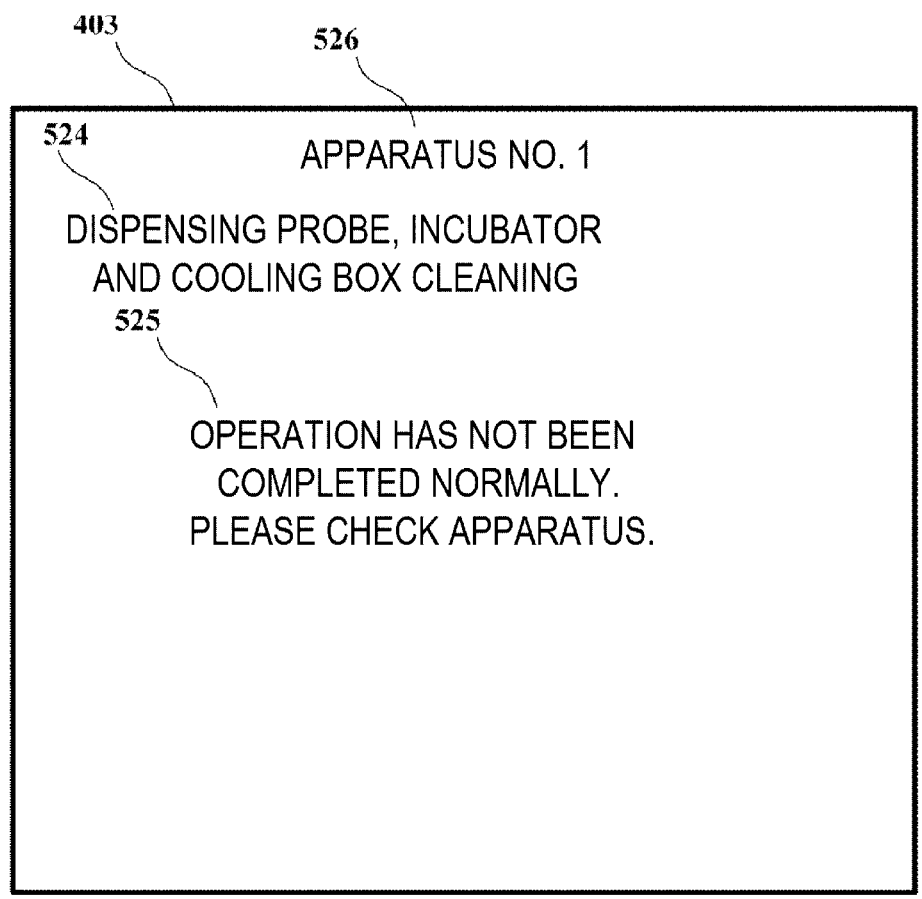

AUTOMATIC ANALYZER AND MAINTENANCE SUPPORT METHOD

TECHNICAL FIELD

The present invention relates to an automatic analyzer and particularly relates to a maintenance support technique of an apparatus by a user.

BACKGROUND ART

In an automatic analyzer, a technique of guiding a user to operate a test device correctly is known. The test device requires a complex maintenance work, and a malfunction may occur in the device due to an erroneous operation of a user during the maintenance work. On the other hand, PTL-1 discloses a technique in which, when a malfunction occurs in a device, a countermeasure against the malfunction is displayed on an operation screen to support the operation of a user.

CITATION LIST

Patent Literature

PTL 1: JP-A-2015-092197

SUMMARY OF INVENTION

Technical Problem

According to PTL 1, a technique in which, when a user uses a test device, a user operation procedure is displayed on a work operation screen such that the user executes the operation without error and the test device operation of the user is supported is known. However, with the support technique using only the screen display, there is a problem in that the user may omit an operation in the case of complex maintenance work.

An object of the present invention is to provide an automatic analyzer and a maintenance support method in which maintenance work of a user and apparatus driving are performed in conjunction with each other such that the operation of the user can be simplified even in complex maintenance work to solve the above-described problem.

Solution to Problem

In order to achieve the above-described object, according to the present invention, there is provided an automatic analyzer including: an input unit that receives a start instruction of maintenance work by a user; a control unit that performs control of a predetermined first processing in accordance with input from the input unit; a measurement device that includes a driving unit that performs driving in accordance with control of the control unit; and a display unit that displays a second processing to be performed by the user in conjunction with the first processing after the first processing by the driving unit is terminated.

In order to achieve the above-described object, according to the present invention, there is provided a maintenance support method for an automatic analyzer which includes a control unit, a driving unit, and a display unit, the maintenance support method including: controlling the driving unit, by the control unit, to perform a predetermined first processing in accordance with input of a start instruction of maintenance work by a user, and causing the display unit to display, by the control unit, a second processing to be performed by the user in conjunction with the first processing after the first processing by the driving unit is terminated.

Advantageous Effects of Invention

According to the present invention, it is possible to provide an automatic analyzer and a maintenance support method in which user work and apparatus driving are performed in conjunction with each other such that the operation of the user can be simplified even in complex maintenance work.

BRIEF DESCRIPTION OF DRAWINGS

FIG. 1 is a top view illustrating a configuration of an automatic analyzer according to a first embodiment.

FIG. 2 is a side view illustrating the configuration of the automatic analyzer according to the first embodiment.

FIG. 3 is a flow chart showing a maintenance work guidance process according to the first embodiment.

FIG. 4 shows a guidance 1 of maintenance work according to the first embodiment.

FIG. 5 shows a guidance 2 of the maintenance work according to the first embodiment.

FIG. 6 shows a guidance 3 of the maintenance work according to the first embodiment.

FIG. 7 shows a guidance 4 of the maintenance work according to the first embodiment.

FIG. 8 illustrates a measurement device including an analysis unit according to a second embodiment.

FIG. 9 is a side view illustrating details of the analysis unit according to the second embodiment.

FIG. 10 shows a work guidance process using a sensor and a camera according to the second embodiment.

FIG. 11 shows a guidance 1 of maintenance work using the sensor and the camera according to the second embodiment.

FIG. 12 shows a guidance 2 of the maintenance work using the sensor and the camera according to the second embodiment.

FIG. 13 shows a guidance 3 of the maintenance work using the sensor and the camera according to the second embodiment.

FIG. 14 shows a guidance 4 of the maintenance work using the sensor and the camera according to the second embodiment.

FIG. 15 illustrates an example of an automatic analyzer capable of communicating with a communication terminal according to a third embodiment.

FIG. 16 shows a process of a work guidance and communication according to the third embodiment.

FIG. 17 shows an example of a maintenance work request displayed on the communication terminal according to the third embodiment.

FIG. 18 shows an example of a driving completion notification displayed on the communication terminal according to the third embodiment.

FIG. 19 shows an example of an apparatus abnormality notification displayed on the communication terminal according to the third embodiment.

DESCRIPTION OF EMBODIMENTS

Hereinafter, various embodiments of the present invention will be described using the drawings.

First Embodiment

A first embodiment relates to an automatic analyzer including: an input unit that receives a start instruction of maintenance work by a user; a control unit that performs control of a predetermined first processing in accordance with input from the input unit; a measurement device that includes a driving unit that performs driving in accordance with control of the control unit; and a display unit that displays a second processing to be performed by the user in conjunction with the first processing after the first processing by the driving unit is terminated. In addition, the first embodiment also relates to a maintenance support method for an automatic analyzer which includes a control unit, a driving unit, and a display unit, the maintenance support method including: controlling the driving unit, by the control unit, to perform a predetermined first processing in accordance with input of a start instruction of maintenance work by a user, and causing the display unit to display, by the control unit, a second processing to be performed by the user in conjunction with the first processing after the first processing by the driving unit is terminated.

FIGS. 1 and 2 are a top view and a side view illustrating a configuration example of an automatic analyzer according to the first embodiment. The automatic analyzer according to the present embodiment will be described using the drawings. An automatic analyzer 1 includes a measurement device 2 that measures a sample and a control device 3. As illustrated in FIG. 1, these devices are connected through a signal line, and the measurement device 2 is controlled in accordance with a control signal from the control device 3.

The measurement device 2 includes: a cooling box 15 for storing a reagent container 14; a stirring rod 16 for stirring the inside of the reagent container 14 stored in the cooling box 15; a dispensing probe 17 for dispensing a reagent from the stirred reagent container 14; and an incubator 18 that keeps warm the reagent dispensed from the dispensing probe 17. The cooling box 15, the stirring rod 16, the dispensing probe 17, and the incubator 18 configure the driving unit of the apparatus, and the driving thereof is controlled by the control device 3. Each of the driving units includes one motor and a position sensor, and whether or not each of the driving units is present at a predetermined position can be determined by the position sensor. In addition, when the stirring rod 16 and the dispensing probe 17 are unnecessary, the stirring rod 16 and the dispensing probe 17 can move to retraction positions 16a and 17a, respectively, indicated by dotted lines.

The control device 3 includes: a control unit 31 that controls a processing and an operation of each component of the automatic analyzer 1; an input unit 32 that receives a work request of a user; a display unit 33 that outputs an operation instruction to the user; a monitoring unit 34 that monitors a state of the measurement device 2; and a memory unit 35 that stores a processing performed by the control unit 31. the monitoring unit 34 monitors the state of the measurement device 2 using position sensor information or the like and monitors whether or not a sample is being measured by the measurement device 2. The control unit of the control device 3 can be configured as a central processing unit (CPU). The entire control device 3 can be configured using a personal computer (PC) including the control unit 31 configured with a CPU, the input unit 32 such as a keyboard or a mouse, the display unit 33 such as a liquid crystal display, and the memory unit 35 such as a semiconductor memory. In this case, the monitoring unit 34 that monitors position sensor information or the like may be implemented by the CPU as the control unit 31 executing a program.

As illustrated in FIG. 2, the measurement device 2 includes an apparatus cover 11 that prevents the user from coming into contact with the driving unit of the measurement device 2, a locking mechanism 12 of the apparatus cover 11, and an open and close sensor 13 of the apparatus cover 11. The automatic analyzer according to the present embodiment includes an interlocking mechanism that turns off the motor of each of the driving units when open and close sensor 13 detects a state where the apparatus cover 11 is opened such that the user is prevented from driving the apparatus unexpected during the work in a state where the apparatus cover 11 is opened. This interlocking mechanism secures the safety of the user during the work. This interlocking mechanism can be implemented using a program to be executed by the control unit 31 of the control device 3, and the open and close sensor 13 or the locking mechanism 12 is configured as a part of the interlocking mechanism.

That is, the control unit according to the present embodiment locks a locking mechanism 12 so that the user does not access the measurement device during the first processing, and releases the locking mechanism 12 so that the user accesses the measurement device at time of transition to the second processing.

FIG. 3 is a diagram showing a guidance process of maintenance work of the user in the automatic analyzer according to the present embodiment. The guidance process is configured with: a first processing for driving the apparatus under the control of the control unit 31 and preparing the work of the user; a second processing for allowing the user to perform the maintenance work; and a third processing for terminating the maintenance work. In this process, it is necessary that the first processing is performed before performing the second processing. After performing all of the first processing and the second processing, the third processing is finally performed. The first processing and the second processing can be alternately performed. In addition, after performing the first processing, the second processing can also be performed multiple times.

In the first processing, a monitoring request of the measurement device 2 is transmitted from the control unit 31 to the monitoring unit 34 in accordance with a work guidance request 101 received from the input unit 32. Based on this request, the monitoring unit 34 determines whether or not to the work can be started, that is, determines 102 whether or not the apparatus can be driven, and transmits the determination result to the control unit 31. When it is determined that the work can be started (YES) in the determination 102, an apparatus driving preparation 103 is performed.

When the monitoring unit 34 determines that a sample is being measured as a result of monitoring, the control unit 31 performs control so that the measurement device 2 does not perform the first processing even if the start instruction is given. This way, when it is determined that the operation start of the driving unit is impossible (NO) in a state where the measurement device 2 is performing measurement or the apparatus cover 11 is opened, the control unit 31 cancels a user work request immediately and terminates the work.

When the driving unit is operable, the apparatus cover 11 is locked using the locking mechanism 12 to prevent careless contact of the user with the driving unit in the apparatus driving preparation 103. After locking the apparatus cover 11, the control unit 31 causes the display unit 33 to display 104 an apparatus driving state. After displaying the apparatus driving state, the control unit 31 instructs the measurement device 2 to drive the apparatus 105 such that the apparatus is driven, and the first processing is completed.

After the driving of the apparatus driving 105 is completed, the second processing is performed in conjunction with the completion of the apparatus driving 105. In the second processing, the monitoring unit 34 checks the state of the measurement device 2, and determines whether or not there is an obstacle for the start of the user work, whether or not the user operation can be started 106. That is, when the output of the position sensor is not a predetermined state, the monitoring unit 34 performs control not to shift to the next step. For example, when it is determined that the apparatus driving 105 is not normally terminated and the start of the user work is impossible (NO), the control unit 31 cancels the user work request and terminates the work.

When it is determined that the user work can be started (YES), the control unit 31 causes the display unit 33 to display a user operation guidance display 107 and transitions to a user work reception preparation 108. In the user work reception preparation 108, the control unit 31 releases the locking mechanism 12 to allow the apparatus cover 11 to enter the open state such that the user accesses the measurement device 2. Concurrently using the interlocking mechanism in which the open and close sensor 13 is used, the control unit 31 turns off the motor of the driving unit of the measurement device 2 and prevents an erroneous operation of the measurement device 2 during the user work. After completion of the user work reception preparation 108, the maintenance work is performed by the user.

After the maintenance work by the user is terminated, a user work completion report 109 is transmitted from the user to the input unit 32. As a result, the input unit 32 receives the next process. Next, the control unit 31 determines 110 whether or not the next processing is the second processing, and when the next processing is the second processing (YES), the control unit performs the user operation guidance display 107 corresponding to the processing content again. When the next processing is not the second processing (NO), the control unit 31 determines 111 whether or not the next processing is the first processing. Next, when the next processing is the first processing (YES), the control unit 31 determines 102 whether or not the apparatus can be driven. When the apparatus can be driven, the first processing (103 to 105) is further performed. That is, the control unit 31 may further perform control of the first processing after the second processing is executed.

Next, when the determination 111 on whether or not the next processing is the first processing is NO, that is, when all the first processing and the second processing are completed, the third processing for updating the work date and time is performed. In the third processing, the control unit 31 transmits the user work completion report 109 to the memory unit 35, updates 112 the work date and time, and terminates the guidance process of maintenance work of the user.

FIG. 3 mainly illustrates a case where the guidance process of maintenance work of the user includes the single first processing and the single second processing. However, each the first processing and the second processing may be performed multiple times according to the content of the maintenance work of the user. In this case, when the first processing and the second processing are alternately performed multiple times, by finally performing the third processing after completion of the first processing and the second processing, the guidance process of maintenance work of the user is configured. In addition, the third processing may include not only the work date and time update 112 but also a step of driving the apparatus and arranging each of the driving units at a predetermined position.

FIGS. 4 to 7 are diagrams illustrating guidances 1, 2, 3, and 4 as guidance display examples during the maintenance work in the automatic analyzer according to the present embodiment. The present embodiment will be described in more detail using the guidance display examples during the maintenance work. When the maintenance work is requested from the user through the input unit 32, the control unit 31 requests the monitoring unit 34 to monitor the state of the measurement device 2. At this time, when it is determined based on the position sensor information or the like that the maintenance work cannot be performed in a state where the apparatus cover is opened or the measurement device 2 is performing measurement, the control unit 31 cancels the work guidance request, and terminates the process immediately.

When the driving unit is operable, the control unit 31 instructs the display unit 33 to display guidances 1 and 201 illustrated in FIG. 4. The guidances 1 and 201 include a maintenance work title 501 indicating a maintenance work title, a current work step position 502 in the number of all the steps, and a maintenance work guidance 503. In addition, the control unit 31 instructs the measurement device 2 to lock the locking mechanism 12 or to drive the stirring rod 16 to the retraction position 16a. After completion of driving, the monitoring unit 34 checks the position of the stirring rod 16 based on the position sensor information of the stirring rod 16. When there is an abnormality that the stirring rod 16 does not move to the retraction position 16a, the monitoring unit 34 transmits information representing that the next step cannot be performed to the control unit 31 such that the control unit 31 cancels the work guidance request and terminates the process immediately.

When the next step can be performed, a driving completion report is transmitted from the monitoring unit 34 to the control unit 31, and the control unit 31 instructs the display unit 33 to display the guidances 2 and 202 illustrated in FIG. 5. The guidances 2 and 202 include a maintenance work title 511, a current work step position 512 in the number of all the steps, a maintenance work guidance 513, and a cleaning completion report unit 514. When the maintenance work such as cleaning includes a plurality of steps, the maintenance work guidance 513 displays the plurality of steps in a predetermined order. The user opens the apparatus cover 11 and cleans the dispensing probe 17 in accordance with the display contents of the guidances 2 and 202. After completion of cleaning, the user closes the apparatus cover 11 and inputs a cleaning completion report through the cleaning completion report unit 514.

As illustrated in FIG. 5, when the display unit 33 functions as the input unit 32 and the guidances 2 and 202 include the cleaning completion report unit 514, the cleaning completion report can be input by touching a predetermined position on the screen. Alternatively, the cleaning completion report can be input by clicking the predetermined position using an input device such as a mouse. The cleaning completion report is transmitted from the monitoring unit 34 to the control unit 31 based on the report from the input unit 32.

The control unit 31 receives the cleaning completion report and causes the display unit 33 to display guidances 3 and 203 illustrated in FIG. 6. The control unit 31 causes the display unit 33 to display the guidances 3 and 203, transmits a locking instruction to the locking mechanism 12, and drives the dispensing probe 17 to be moved to the retraction position 17a. After completion of driving, the monitoring unit 34 checks the position of the dispensing probe 17 based on the position sensor information of the dispensing probe 17. When there is an abnormality that the dispensing probe 17 is not moved to the retraction position 17a, the monitoring unit 34 transmits information representing that the next step cannot be performed to the control unit 31 such that the control unit 31 cancels the work guidance request and terminates the process immediately.

When the next step can be performed, a completion report is transmitted to the control unit 31, and the control unit 31 instructs the display unit 33 to display the guidances 4 and 204 illustrated in FIG. 7. This way, when the second processing includes a plurality of steps, the control unit 31 causes the display unit 33 to display the plurality of steps in a predetermined order.

In this step, the user opens the apparatus cover 11 and cleans the cooling box 15 in accordance with the display of the guidances 4 and 204. After completion of cleaning, the user inputs the cleaning completion by touching or clicking the maintenance work completion report unit 515. The control unit 31 determines that the work is terminated based on the report of the input unit 32, and transmits the cleaning completion report of the dispensing probe 17 and the cooling box 15 to the memory unit 35. The memory unit 35 updates a cleaning performing date and time of the dispensing probe 17 and the cooling box 15 to the current time and terminates the maintenance work corresponding to the user work request.

With the configuration and operation of the automatic analyzer according to the present embodiment described above, it is possible to provide an automatic analyzer and a maintenance support method in which user work and apparatus driving are performed in conjunction with each other such that the operation of the user can be simplified even in complex maintenance work.

Second Embodiment

A second embodiment relates to an automatic analyzer and a maintenance support method in which, in addition to the configuration of the first embodiment, the measurement device includes a camera that images inside of the measurement device, and the control unit performs control not to shift to a next step when it is determined that a maintenance target unit is not in a predetermined state as a result of determining an image obtained by imaging the maintenance target unit with the camera after the first processing or the second processing is executed.

FIG. 8 is a diagram illustrating the automatic analyzer 1 including an analysis unit 19 according to the second embodiment. The measurement device 4 has a configuration in which the analysis unit 19 is added to the configuration of the measurement device 2 according to the first embodiment. FIG. 9 is a side view illustrating details of the analysis unit 19. The analysis unit 19 includes: a storage cup 51 that temporarily stores a reagent to be used when a reaction solution that is caused to react in the incubator 18; an aspiration nozzle 52 that aspirates the reagent from the storage cup 51; a discharge nozzle 53 that discharges the reagent into the storage cup 5; and a camera 54 that images the inside of the analysis unit 19.

FIG. 10 is a diagram illustrating an example of a guidance process of maintenance work of the user in the configuration of the present embodiment. This process has a configuration in which a work omission checking step 113 is further added to the second processing of the guidance process illustrated in FIG. 3.

FIGS. 11, 12, 13, and 14 are diagrams illustrating guidances 5, 6, 7, and 8 displayed by the display unit 33 as examples of the maintenance work of the analysis unit 19. The maintenance work of the analysis unit 19 will be described as an example. When the maintenance work is requested from the user through the input unit 32, the first processing is started, the control unit 31 requests the monitoring unit 34 to report the state of the measurement device 2. At this time, in the present embodiment, the inside of the analysis unit 19 is imaged using the camera 54 of the analysis unit 19.

When the control unit 31 or the determination unit of the monitoring unit 34 does not check the storage cup 51 at the predetermined position in the obtained image, the control unit 31 or the determination unit of the monitoring unit 34 determines that there is an abnormality in the apparatus state, cancels the work guidance request, and terminates the process immediately. In addition, when the determination unit determines that the maintenance work cannot be performed in a state where the apparatus cover 11 is opened or the measurement device 2 is performing measurement, the determination unit of the monitoring unit 34 also cancels the work guidance request and terminates the process immediately. The functions of the determination unit in the present embodiment can be implemented by the CPU configuring the control unit 31 or the monitoring unit 34 executing a program.

When it is determined that the following step can be performed, the control unit 31 instructs the display unit 33 to display guidances 5 and 301 illustrated in FIG. 11. In addition, the control unit 31 instructs the measurement device 2 to perform driving, and performs a step of aspirating and removing the reagent remaining in the storage cup 51 through the aspiration nozzle 52. After completion of driving, the monitoring unit 34 transmits the driving completion report to the control unit 31 such that the control unit 31 shifts to the second processing.

In the second processing, the control unit 31 instructs the display unit 33 to display guidances 6 and 302 illustrated in FIG. 12 based on the report. The user opens the apparatus cover 11 and cleans the aspiration nozzle 52 and the discharge nozzle 53 in the analysis unit 19 in accordance with the guidances 6 and 302. After completion of cleaning, the user closes the apparatus cover 11 and inputs the cleaning completion by touching or clicking the maintenance work completion report unit 515. Based on the report from the input unit 32, the control unit 31 transmits an instruction to the monitoring unit 34 to check the state of the measurement device 2.

The monitoring unit 34 images the inside of the analysis unit 19 using the camera 54 again. The result of imaging is transmitted to the monitoring unit 34. For example, when foreign matter 71 is present in the discharge nozzle 53 in the obtained image, the result of insufficient cleaning is transmitted to the control unit 31. The control unit 31 cancels the work completion report of the user, displays a message for urging recleaning on the guidances 6 and 302, and waits for the input of cleaning completion from the user again. In addition, when the storage cup 51 is not checked at the predetermined position, the monitoring unit 34 reports abnormality in the position of the storage cup 51 to the control unit 31. The control unit 31 cancels the work completion report of the user, displays a message for urging rearrangement of the storage cup 51 on the guidances 6 and 302, and waits for the input of cleaning completion from the user again.

When there is no abnormality as a result of imaging with the camera 54, the monitoring unit 34 transmits the cleaning completion report to the control unit 31. The control unit 31 instructs the display unit 33 to display guidances 7 and 303 illustrated in FIG. 13. In addition, the control unit 31 instructs the measurement device 2 to perform the step of discharging the reagent from the discharge nozzle 53 into the storage cup 51 and aspirating the reagent using the aspiration nozzle 52 multiple times to clean the inside of the flow path. After completion of driving, the control unit 31 instructs the display unit 33 to display guidances 8 and 304 illustrated in FIG. 14.

The user opens the apparatus cover 11 and cleans the incubator 18 in accordance with the display of the guidances 8 and 304. In the present embodiment, the incubator 18 includes a position sensor that monitors a rotation angle. During the cleaning work of the user, the monitoring unit 34 monitors the rotation angle of the incubator 18 using the position sensor information of the incubator 18. After completion of cleaning, the user closes the apparatus cover 11 and inputs the cleaning completion by touching or clicking the maintenance work completion report unit 515. When the incubator does not rotate once or more after the report, the monitoring unit 34 determines that cleaning is not completely performed, and reports the result to the control unit 31. The control unit 31 cancels the work completion report of the user, displays a message for urging recleaning on the guidance 304, and waits for the input of cleaning completion from the user again. When the incubator rotates once or more, the monitoring unit 34 reports cleaning completion to the control unit 31. The control unit 31 determines the cleaning completion based on the report of the input unit 32 and transmits the cleaning completion report of the analysis unit 19 to the memory unit 35. The memory unit 35 updates the cleaning performing date and time of the analysis unit 19 to the current time.

With the above-described configuration of the second embodiment, in addition to the effect of the apparatus according to the first embodiment, whether or not the maintenance work of the user is reliably performed can be checked.

Third Embodiment

A third embodiment relates to an automatic analyzer further including, in addition to the configuration of the first embodiment or the second embodiment, a transmission unit that transmits information related to the automatic analyzer to outside, in which the transmission unit transmits such information, to an electronic terminal capable of receiving the information, that the first processing is completed at time of completion of the first processing. In addition, the third embodiment relates to an automatic analyzer further including a reception unit that receives information related to the automatic analyzer from outside, in which the user transmits the maintenance work start instruction by using an electronic terminal capable of transmitting the information, thereby executing the first processing.

FIG. 15 is a diagram illustrating the automatic analyzer capable of communicating with an electronic terminal. The present embodiment has a configuration in which an external terminal 6 as the electronic terminal is added to the automatic analyzer 1 according to the first embodiment. In addition, the control device 5 has a configuration in which a transmission unit 36 and a reception unit 37 are added to the configuration of the control device 3 according to the first embodiment or the second embodiment, the transmission unit 36 transmitting information of the control unit 31 to the external terminal 6, and the reception unit 37 receiving an apparatus driving request such as the maintenance work start instruction from the external terminal 6 and reporting the information to the control unit 31.

The external terminal 6 as the electronic terminal includes: a reception unit 38 that receives the information of the control unit 31 transmitted from the control device 5; a display unit 39 that displays the information received by the reception unit 38 to the user; an input unit 40 that receives a maintenance work request from the user; and a transmission unit 41 that transmits the maintenance work request received by the input unit 40 to the control device 5. It is preferable that communication means between the control device 5 and the external terminal 6 as the electronic terminal is wireless.

FIG. 16 is a diagram illustrating a process of a work guidance and communication. The user performs the maintenance work request 601 using the input unit 32 of the control device 5 or the input unit 40 of the external terminal 6. FIG. 17 shows an example of a maintenance work request displayed on the communication terminal. For the user, a work start screen 401 includes a maintenance work title 516 of a maintenance work item, an implementation content 517, a maintenance work request unit 518, and a unique number or name 519 related to the device to be driven. When the user touches the maintenance work request unit 518 displayed on the input unit 40 of the external terminal 6, the maintenance work request of the user is transmitted from the transmission unit 41 to the reception unit 37 of the control device 5, and the maintenance work request is reported to the control unit 31.

The first processing 602 is performed in accordance with the maintenance work request 601 received by the control unit 31. When the first processing 602 is normally performed, the completion report is transmitted from the control unit 31 to the transmission unit 36, and a first processing completion notification 604 is transmitted to the reception unit 38 of the external terminal 6. By causing the display unit 39 of the external terminal 6 to display the received first work completion notification 604, the completion of the first processing is notified to the user. FIG. 18 shows an example of a driving completion notification displayed on the communication terminal. The display unit 39 of the external terminal 6 displays a first processing termination report screen 402. The first processing termination report screen 402 causes the display unit 39 to display, to the user, a title 520 of a maintenance work item, a guidance 521 of the completed first processing, a display 522 indicating a current work step position in the number of all the steps, and a unique number or name 523 related to the device of which the first processing is completed.

When an abnormality occurs in the measurement device 2 or the control device 5 after performing the first processing 602, an abnormal process report 605 is reported from the control unit 31 to the transmission unit 36, and an abnormal process report 605 is transmitted to the reception unit 38 of the external terminal 6. By causing the display unit 39 of the external terminal 6 to display the received abnormal process report 605, the occurrence of the abnormal process is notified to the user. FIG. 19 shows an example of an apparatus abnormality notification displayed on the communication terminal. The abnormality report screen 403 causes the display unit 39 to display, to the user, a title 524 of a maintenance work item, a guidance 525 of the abnormal process, and a unique number or name 526 related to the device of which the first processing is completed. Further, the control unit 31 terminates the maintenance work immediately.

According to the third embodiment, in addition to the first embodiment or the second embodiment, even when it is difficult for the user to directly see the apparatus screen during the maintenance work, the maintenance work guidance can be performed remotely using an electronic terminal such as a mobile terminal.

The present invention is not limited to the above-described embodiments and includes various modification examples. For example, the embodiments have been described in detail for easy understanding of the present invention, and the present invention is not necessarily limited to include all the configurations described above.

Further, the example in which some or all of the above-described respective configurations, functions, control units, and the like are implemented by creating programs has been mainly described. However, some or all of the above-described respective configurations, functions, control unit, and the like may be implemented by hardware, for example, by designing an integrated circuit. That is, some or all of the functions of the control units may be implemented with an integrated circuit such as an Application Specific Integrated Circuit (ASIC) or a Field Programmable Gate Array (FPGA) in place of the programs.

REFERENCE SIGNS LIST 1 automatic analyzer
2 measurement device
3 control device
4 measurement device
5 control device
6 external terminal
11 apparatus cover
12 locking mechanism
13 open and close sensor
14 reagent container
15 cooling box
16 stirring rod
17 dispensing probe
18 incubator
19 analysis unit
31 control unit
32 input unit
33 display unit
34 monitoring unit
35 memory unit
36 transmission unit
37 reception unit
38 external terminal reception unit
39 external terminal display unit
40 external terminal input unit
41 external terminal transmission unit
51 storage cup
52 aspiration nozzle
53 discharge nozzle
54 camera
71 foreign matter
201 guidance 1
202 guidance 2
203 guidance 3
204 guidance 4
301 guidance 5
302 guidance 6
303 guidance 7
304 guidance 8
401 work start screen
402 first processing termination report screen
403 abnormality report screen
501 maintenance work title of guidance 1
503 maintenance work guidance of guidance 1
511 maintenance work title of guidance 2
513 maintenance work guidance
514 cleaning completion report unit
515 maintenance work completion report unit
516 maintenance work title of work start screen
517 implementation content of work start screen
518 work start screen maintenance work request unit
520 maintenance work title of first processing termination report screen
521 driving guidance of first processing termination report screen
524 maintenance work title of abnormality report screen

The invention claimed is:

1. An automatic analyzer comprising:
an input unit configured to receive a start instruction of maintenance work input by a user;
a control unit that performs control of a predetermined first processing in accordance with input received via the input unit;
a measurement device that includes a driving unit comprising at least one motor and position sensor that performs driving of one or more components of the measurement device in accordance with control of the control unit;
a monitoring unit that monitors whether a sample is being measured by the measurement device; and
a display unit that displays a second processing to be performed by the user in conjunction with the first processing after the first processing by the driving unit is terminated, wherein
the one or more components of the measurement device comprises a stirring rod and a dispensing probe,
the control unit is further configured to cause one of a stirring rod and a dispensing probe to be moved to a retraction position during the first processing, and
when the monitoring unit determines that a sample is being measured, the control unit performs control so that the measurement device does not perform the first processing even if the start instruction is given.

2. The automatic analyzer according to claim 1, wherein the control unit further performs control of the first processing after the second processing is executed.

3. The automatic analyzer according to claim 1, wherein the control unit locks a locking mechanism of the measurement device so that the user does not access the measurement device during the first processing, and releases the locking mechanism so that the user accesses the measurement device at time of transition to the second processing.

4. The automatic analyzer according to claim 1, wherein the second processing includes a plurality of steps, and the display unit displays the plurality of steps in a predetermined order.

5. The automatic analyzer according to claim 1, wherein the control unit stores maintenance work completion date and time in a memory unit after the maintenance work is completed.

6. The automatic analyzer according to claim 1 comprising:
a position sensor that detects a position of the driving unit, wherein
when output of the position sensor is not in a predetermined state after the first processing or the second processing is executed, the control unit performs control not to shift to a next step.

7. The automatic analyzer according to claim 1, wherein the measurement device includes an analysis unit and a camera that images inside of the measurement device, and
the control unit performs control not to shift to a next step when it is determined that a maintenance target unit is not in a predetermined state as a result of determining an image obtained by imaging the maintenance target unit inside the analysis unit with the camera after the first processing or the second processing is executed.

8. The automatic analyzer according to claim 1 comprising:
a transmission unit that transmits information related to the automatic analyzer to outside, wherein
the transmission unit transmits such information, to an electronic terminal capable of receiving the information, that the first processing is completed at time of completion of the first processing.

9. The automatic analyzer according to claim 1 comprising:
   a reception unit that receives information related to the automatic analyzer from outside, wherein
   the user transmits the start instruction by using an electronic terminal capable of transmitting the information, thereby executing the first processing.

10. The automatic analyzer according to claim 1, wherein the stirring rod is moved to the retraction position, and the second processing is cleaning of a dispensing probe.

11. The automatic analyzer according to claim 1, wherein the dispensing probe is moved to the retraction position, and
   the second processing is cleaning of a cooling box.

12. A maintenance support method for an automatic analyzer which includes a control unit, a driving unit, a monitoring unit, an input unit, and a display unit, the maintenance support method comprising:
   controlling the driving unit, by the control unit, to perform a predetermined first processing in accordance with input of a start instruction of maintenance work received via the input unit from a user,
   monitoring, using the monitoring unit, whether a sample is being measured by the measurement device; and
   causing the display unit to display, by the control unit, a second processing to be performed by the user in conjunction with the first processing after the first processing by the driving unit is terminated, wherein
   controlling the driving unit further comprises
      causing one of a stirring rod and a dispensing probe to be moved to a retraction position during the first processing, and
      when the monitoring unit determines that a sample is being measured, controlling the measurement device to not perform the first processing even if the start instruction is given.

13. The maintenance support method according to claim 12, wherein
   the stirring rod is moved to the retraction position, and
   the second processing is cleaning of a dispensing probe.

14. The maintenance support method according to claim 12, wherein
   the dispensing probe is moved to the retraction position, and
   the second processing is cleaning of a cooling box.

* * * * *